L. C. WEBER.
LAWN MOWER.
APPLICATION FILED JUNE 21, 1918.
1,296,577.
Patented Mar. 4, 1919.
2 SHEETS—SHEET 1.
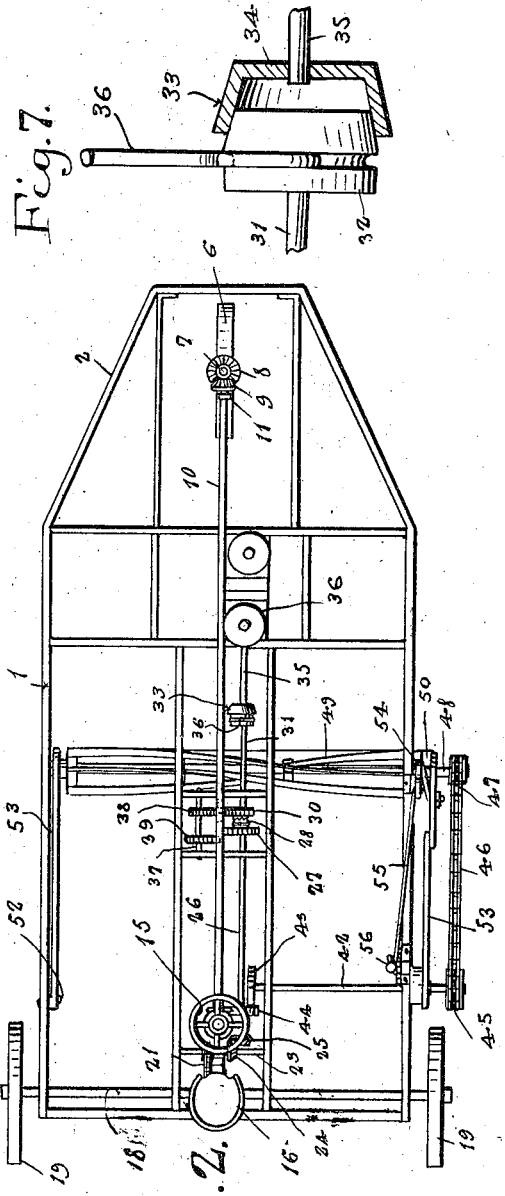
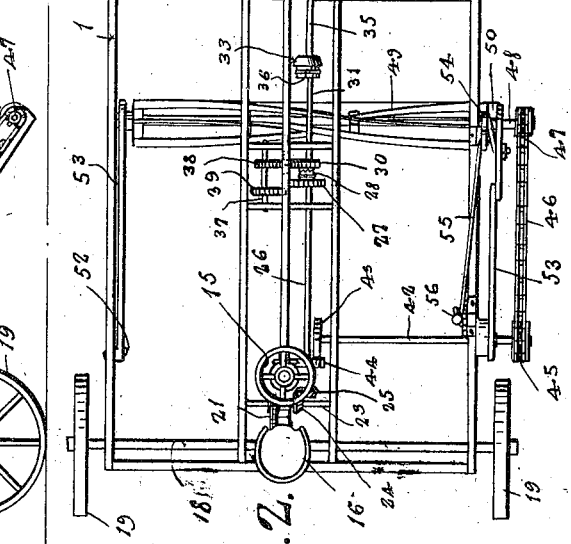
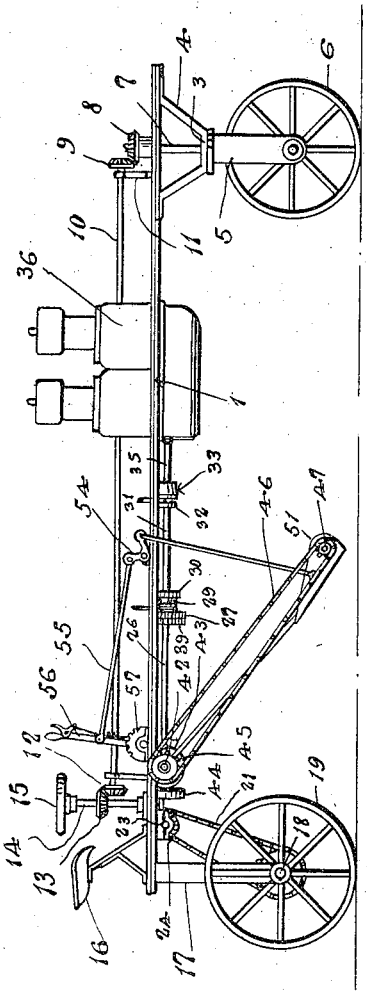
Inventor
L. C. Weber.
By
Attorney

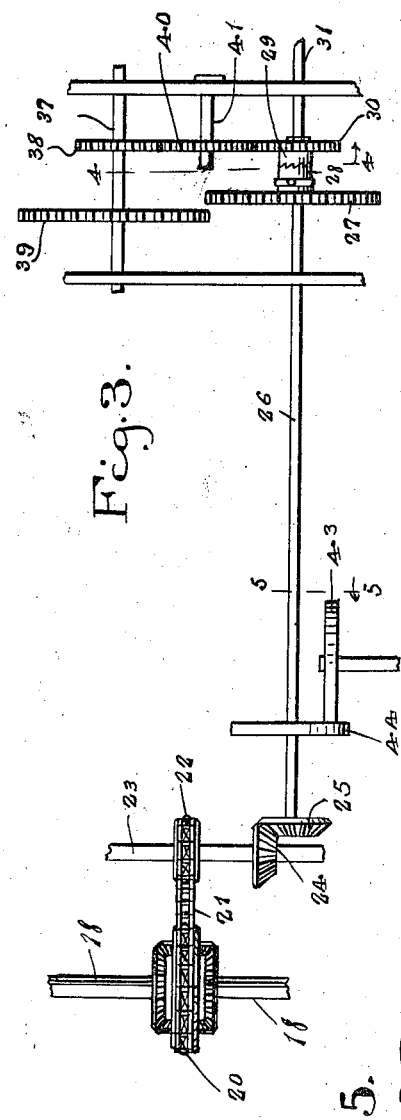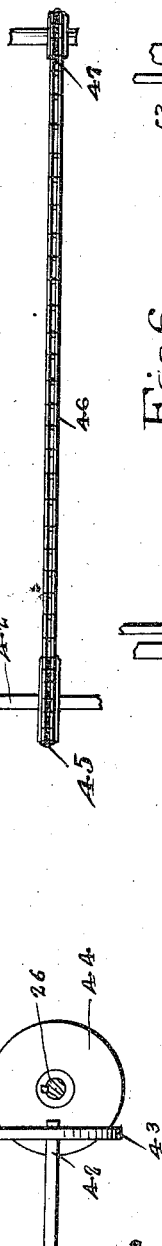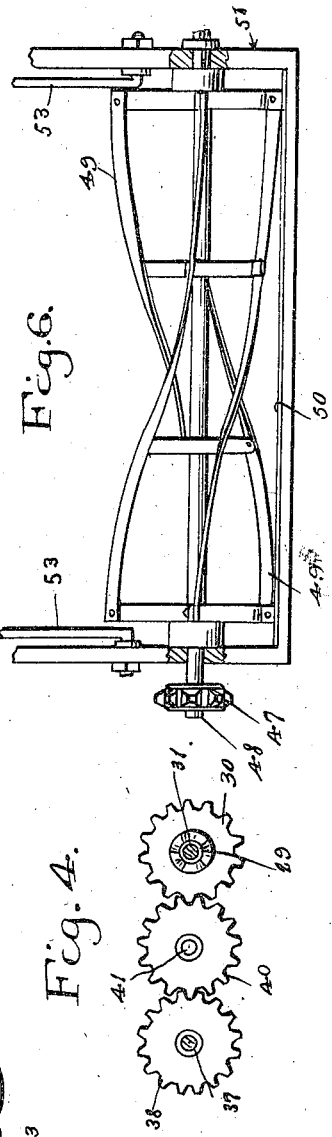

UNITED STATES PATENT OFFICE.

LAURENCE C. WEBER, OF MECHANICSBURG, PENNSYLVANIA.

LAWN-MOWER.

1,296,577.                Specification of Letters Patent.       Patented Mar. 4, 1919.

Application filed June 21, 1918. Serial No. 241,236.

*To all whom it may concern:*

Be it known that I, LAURENCE C. WEBER, a citizen of the United States, residing at Mechanicsburg, in the county of Cumberland and State of Pennsylvania, have invented certain new and useful Improvements in Lawn-Mowers; and I do hereby declare the following to be a full, clear, and exact description of the invention, such as will enable others skilled in the art to which it appertains to make and use the same.

This invention relates to improvements in lawn mowers, and has for one of its objects the provision of means whereby the device is propelled by motor power, thus obviating manual power for such purpose, thereby rendering the device especially adaptable for cutting large grass areas.

Another object of the invention is the provision of means for raising and lowering the cutter on the main frame when desired.

A further object of this invention is the provision of means whereby a device may be propelled in a rearward or forward direction by the motor power, as desired.

A still further object of this invention is the provision of a lawn mower of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a side elevation of a lawn mower constructed in accordance with my invention, Fig. 2 is a top plan view of the same, Fig. 3 is a fragmentary plan view of the driving mechanism of the device, Fig. 4 is a sectional view, taken on the line 4—4 of Fig. 3, Fig. 5 is a detail sectional view, taken on the line 5—5 of Fig. 3, Fig. 6 is a fragmentary sectional view of the cutting means, and Fig. 7 is a detail sectional view of a clutch.

Referring in detail to the drawings, the numeral 1 indicates a main frame, which is of substantially rectangular formation having its forward end reduced, as illustrated at 2. The reduced end 2 of the frame 1 has secured thereto a fifth wheel 3 by means of a bracket 4. Arms 5 are associated with the fifth wheel to which is journaled a front wheel 6. The fifth wheel 3 is connected together by a vertical shaft or king bolt 7, having secured to its upper end a beveled gear 8, which meshes with a beveled gear 9. The beveled gear 9 is secured to a shaft 10 supported in brackets 11 carried by the frame 1. The shaft 10 extends rearwardly of the frame and has secured to its rear end a beveled gear 12, meshing with a beveled gear 13 carried by the post 14 of a steering wheel 15. The steering wheel 15 is located adjacent the operator who occupies the seat 16, and thus it will be seen that by turning the steering wheel 15 the front wheel 6 may be turned in a corresponding direction to steer the frame.

The rear end of the frame 1 has secured thereto downwardly depending standards 17, in which is journaled a rear axle 18, having secured to each end wheels 19. The rear axle 18 is provided with the usual differential, and the ring gear 20 has sprocket teeth to engage an endless chain 21, which passes over a sprocket wheel 22, secured to a transverse shaft 23 journaled in the frame 1 adjacent its rear end. The transverse shaft 23 has secured thereto a beveled gear 24, which meshes with a beveled gear 25 secured to a driven shaft 26. The driven shaft 26 is journaled to the frame 1 in any desired manner and has splined to its forward end a direction and speed changing gear 27. The gear 27 has clutch teeth 28 adapted to coöperate with clutch teeth 29 formed upon a gear 30 secured to a drive shaft 31. The drive shaft 31 is journaled in the frame and has secured to its forward end the male member 32 of a conical clutch 33. The female member 34 of the clutch 33 is secured to the crank shaft 35 of an engine 36 mounted upon the frame 1, and which may be of any desired type. The male member 32 of the clutch 33 has connected thereto an actuating lever 36 for engaging and disengaging the male member with the female member of the clutch 33. Thus it will be seen by engaging the members of the clutch 33, the engine will drive the rear wheels 19 to cause the device to move forwardly.

A counter shaft 37 is journaled to the frame 1 and has mounted thereon gears 38 and 39. The gear 38 meshes with a gear 40, journaled to a stub shaft 41 carried by the frame and the gear 40 meshing with the gear 30. When it is desired to reverse the direction of the device, the clutch elements 28 and 29 are disengaged and the gear 39, is moved in mesh with the gear 39, causing the rear wheels to be driven in a reverse direction at a reduced speed.

A shaft 42 is journaled in the frame 1 and has secured to one end a friction disk 43, which engages a friction disk 44 secured to the driven shaft 26. A sprocket gear 45 is secured to the shaft 42, and has mounted thereon a sprocket chain 46, which passes over a sprocket wheel 47 secured to a shaft 48 that supports the cutting knives 49. The cutting knives 49 are of the usual construction, consisting of the curved blades having their edges sharpened for coöperation with a cutting knife 50. The knife 50 is stationary and is carried by an auxiliary frame 51. The auxiliary frame 51 is pivoted to the main frame 1, as illustrated at 52, and is of substantially U-shaped formation. It will, therefore, be seen upon rotation of the friction disk 44 the cutting knives 49 will be rotated, cutting the grass in coöperation with the stationary knife 50.

An elevating rod 53 is pivoted to the auxiliary frame 50 and to a bell crank lever 54. The bell crank lever is pivotally mounted upon the main frame 1, and has connected thereto a rod 55, which is in turn pivoted to a controlling lever 56. The controlling lever 56 is provided with a catch that coöperates with a segment 57 on the frame 1 in holding the frame at various positions, so that the height of the cutter can be varied when desired.

By having the cutter driven by a friction disk provides means wherein the various gears and other parts of the device will be prevented from breaking in case of the cutting knives 49 engaging stones and like obstacles as the disk 44 will move in relation to the disk 43 when undue strain is placed upon the cutting knives.

While I have shown and described the preferred embodiment of my invention, it will be understood that minor changes in construction, combination and arrangement of parts may be made without departing from the spirit and scope of the invention as claimed.

Having thus described my invention, what I claim is:

A lawn mower comprising a main frame, a front rear wheels journaled to the frame, a front wheel pivotally mounted in said frame, means steering said front wheel, an engine carried by said frame, a driven shaft journaled with said engine, a transverse shaft journaled in said frame, a transverse shaft journaled in said frame and connected to the driven shaft, means connecting the transverse shaft with the rear wheels, a counter shaft journaled in said frame, a pair of gears carried by said counter shaft, a stub shaft carried by said frame, a gear journaled to the stub shaft and in mesh with one of the gears of said pair, a drive shaft journaled in said frame and connected to the engine, a gear secured to the drive shaft, a clutch element formed on said last-named gear, a gear splined to the driven shaft, a clutch element carried by the last-named gear and adapted to engage the first-named clutch element for driving the rear wheels in a forward direction, cutting means carried by said frame, and means driving said cutting means by the driven shaft.

In testimony whereof I affix my signature in presence of two witnesses.

LAURENCE C. WEBER.

Witnesses:
Jas. L. Young,
C. I. Swartz.